United States Patent [19]

Maleschew

[11] Patent Number: 4,546,531
[45] Date of Patent: Oct. 15, 1985

[54] SET OF COMPONENTS FOR BUILDING MACHINE TOOLS

[75] Inventor: Josef Maleschew, Elsbethen, Austria

[73] Assignee: Maier & Co., Hallein, Austria

[21] Appl. No.: 567,760

[22] Filed: Jan. 3, 1984

[30] Foreign Application Priority Data

Jan. 3, 1983 [DE] Fed. Rep. of Germany ....... 8300040

[51] Int. Cl.[4] .............................................. B23Q 37/00
[52] U.S. Cl. .................................. 29/560; 51/166 FB;
82/32; 144/1 C; 408/234; 409/240
[58] Field of Search ................... 29/560, 560.1; 82/32, 82/9; 446/127, 145; 144/1 C; 409/225, 235, 240, 241, 242; 408/234, 20; 51/166 FB

[56] References Cited

U.S. PATENT DOCUMENTS

| 207,852 | 9/1878 | Cherry | 82/32 |
| 232,436 | 9/1880 | Barnes et al. | 82/32 X |
| 3,867,054 | 2/1975 | Muller | 408/234 |

FOREIGN PATENT DOCUMENTS

| 1808208 | 9/1970 | Fed. Rep. of Germany | 446/127 |
| 588608 | 6/1977 | Switzerland | 446/127 |

Primary Examiner—Z. R. Bilinsky
Attorney, Agent, or Firm—McCormick, Paulding & Huber

[57] ABSTRACT

The disclosure relates to a set of components for a machine tool including at least one elongated machine bed and one spindle stock, with a drive motor, adjustably guided on the machine bed, with components connectible with the machine bed being held to the machine bed by a groove and spline guide running in the longitudinal direction of the bed.

13 Claims, 8 Drawing Figures

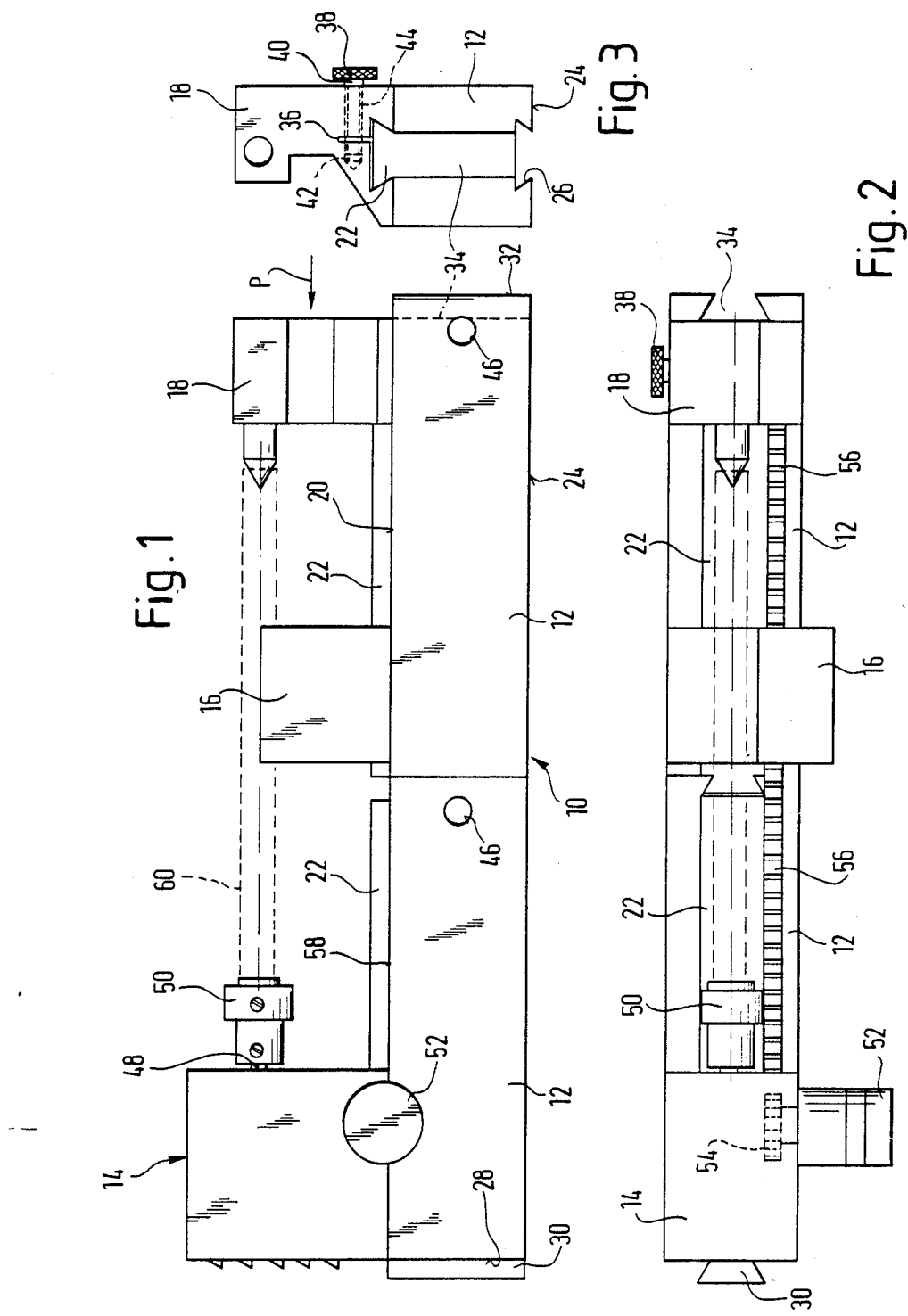

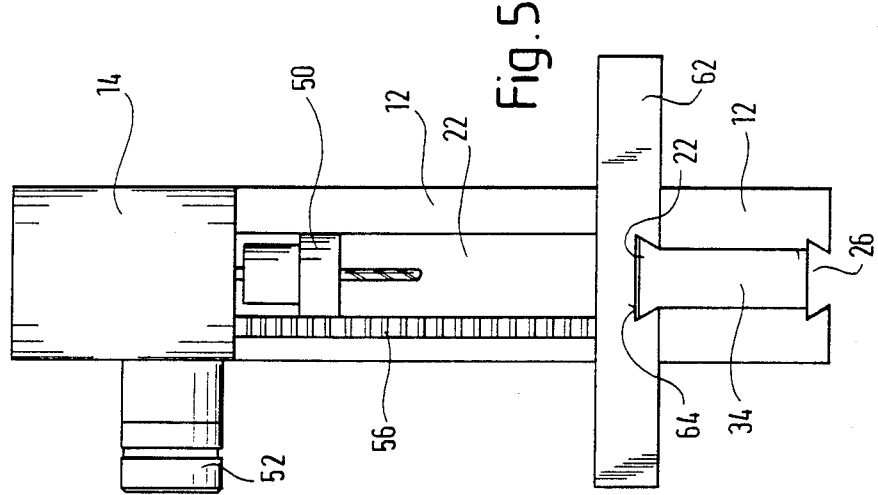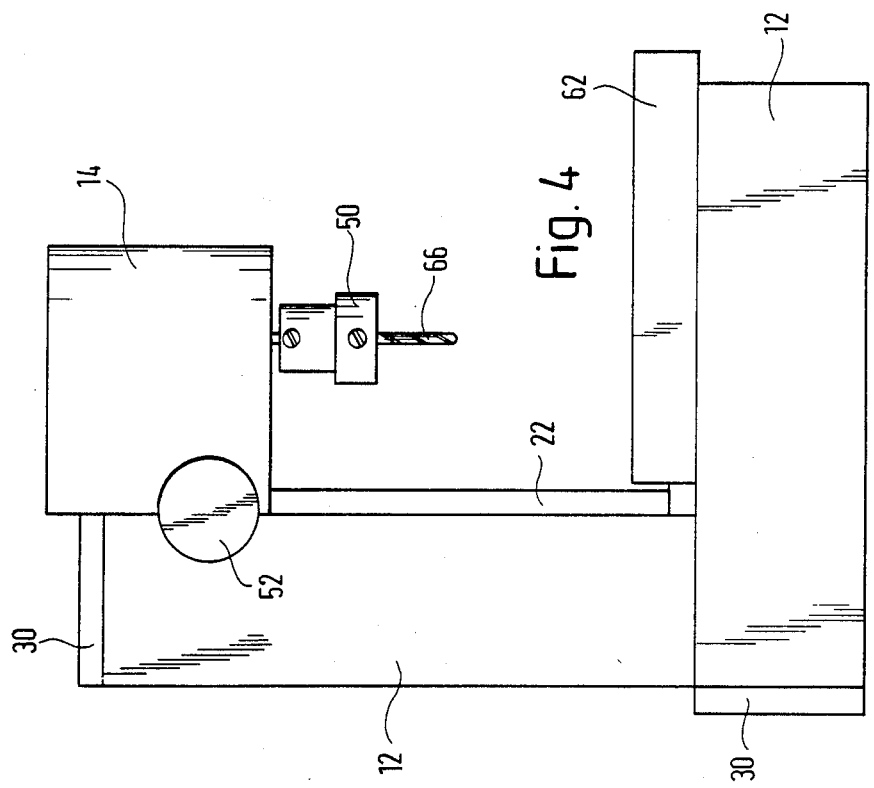

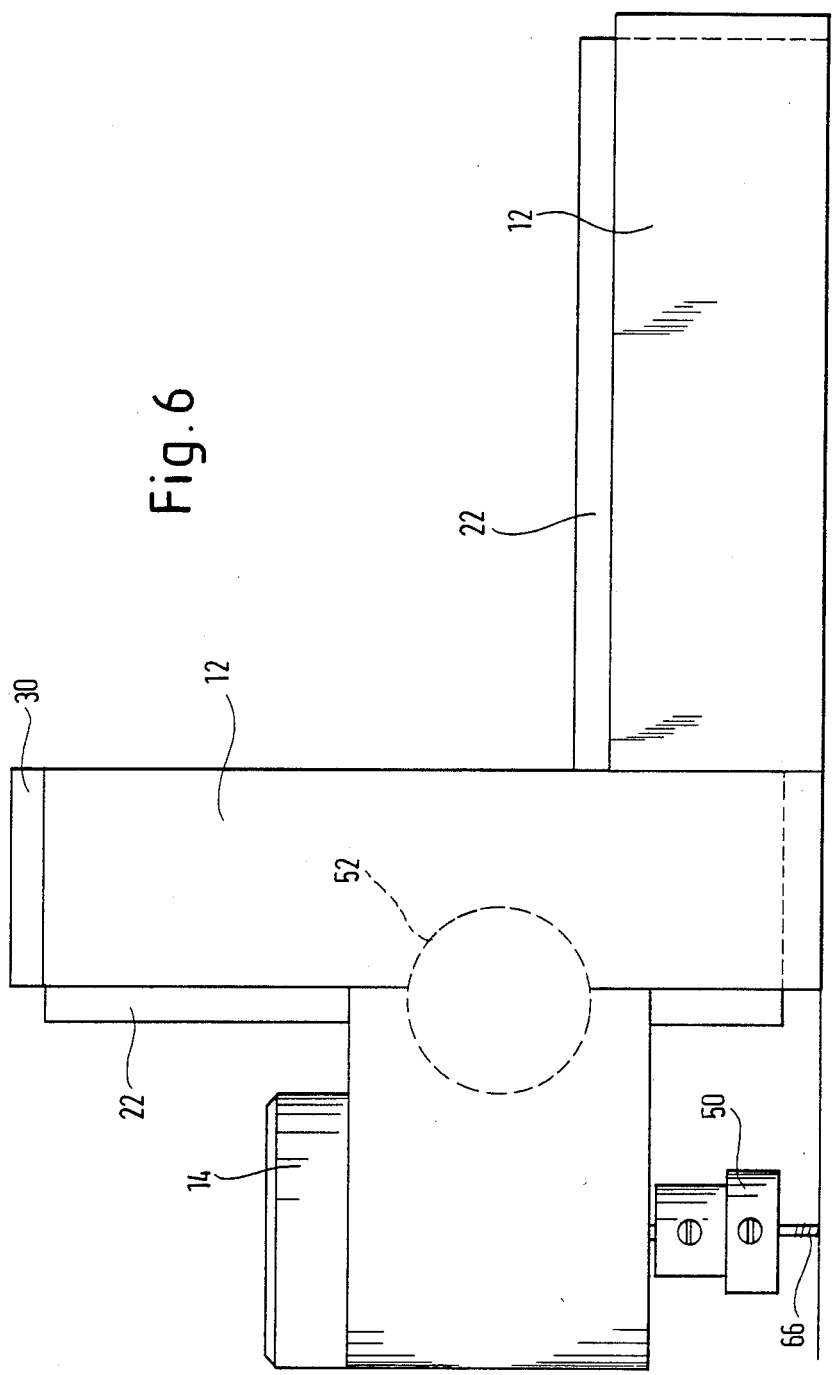

SET OF COMPONENTS FOR BUILDING MACHINE TOOLS

The invention relates to a set of components for a machine tool including at least one elongated machine bed and one spindle stock, with a drive motor, adjustably guided on the machine bed, with components connectible with the machine bed being held to the machine bed by means of a groove and spline guide running in the longitudinal direction of the bed.

Such machine tool component sets are known for industry and for home workers. Because of their requirements with regard to precision and performance these building sets are expensive and costly to manufacture and according to the type of machine and the product to be manufactured require a more or less comprehensive and careful construction for their use.

The invention has as its object the provision of a set of components of the above described type suited for use by children as constructive toys and which accordingly are simple in construction and economical to manufacture. The building set should permit the construction of as large a number as possible of machine tools from a small number of individual components.

The object of the invention is attained in that the machine bed is divided, perpendicular to its longitudinal direction, into at least two sections connectible with one another through a groove and spline connection whose cross sectional dimensions correspond to that of the groove and spline guide for the other building components.

This construction of the machine bed offers the possibility of building several machine tools by simple conversion of sections of the machine bed and exchange of the other building components, as explained below in connection with exemplary embodiments.

Preferably each section of the machine bed has a spline on one of its end faces and a complementary groove on the other of its end faces. In this way not only two sections but also several such sections can be connected to one another in a desired succession, or additional building components can be attached to the free surfaces of the sections of the machine bed.

Preferably the spline of the groove and spline guide for the support of building components is constructed on the machine bed. This gives the possibility of providing in the longitudinal side of the machine bed opposite to the spline a complementary groove arranged parallel to the spline so that the sections of the machine bed can for example be set onto and connected with one another. In order to provide a good stand and support surface for the machine tool in each combination, it is practical for the machine bed to have a generally rectangular shape with rectangular cross section, with the grooves and splines located midway between and parallel to the edges of their associated bed faces. The greater the symmetry of the building components the larger is the number of ways in which they can be used. Preferably the sections of the machine bed are therefore constructed identical to one another.

Clamping elements, for example clamping screws, can be provided on the sections of the machine bed or on the other building components to fix the connected parts in their given positions.

In order to drivingly adjust the building components on the machine bed, according to one feature of the invention, at least one rack is constructed on the machine bed along the groove or spline which serves to support the building components, which rack meshes with a pinion or gear supported by a building component. By rotating the gear the building component can thereby be adjusted along the machine bed.

Further features and advantages of the invention will be apparent from the following description which is made in connection with the accompanying drawings. These drawings are:

FIG. 1 is a side view of a lathe made from building components of the invention.

FIG. 2 is a plan view of the arrangement of FIG. 1.

FIG. 3 is an end view of the arrangement of FIG. 1 taken in the direction of the arrow P of FIG. 1.

FIG. 4 is a side view of a drill press made with building components of the invention.

FIG. 5 is a front view of the drill press of FIG. 4.

FIG. 6 is a side view of a hand drilling machine made with building components of the invention.

Figure 7:
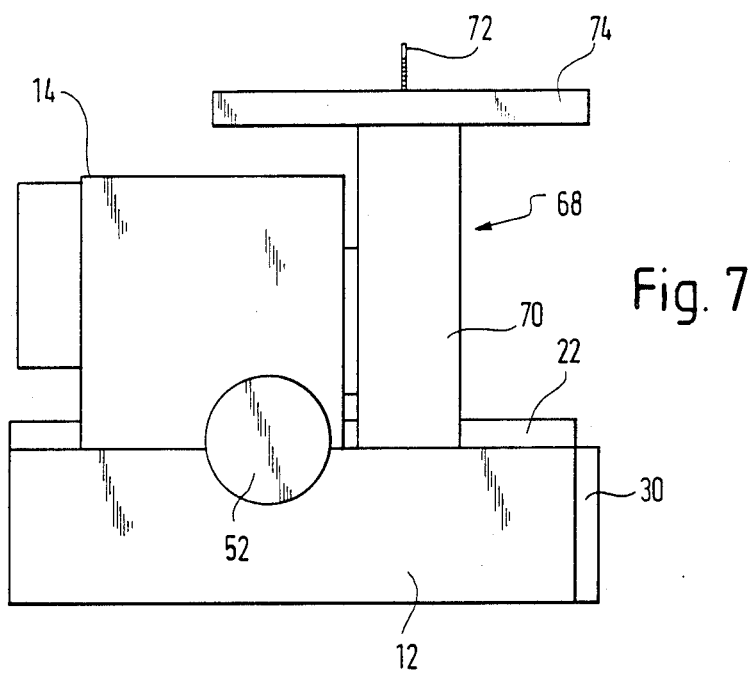
FIG. 7 is a side view of a jigsaw made with building components of the invention.

The lathe shown schematically in FIGS. 1 to 3 includes a machine bed indicated generally at 10 consisting of two identical sections 12, as well as a spindle stock 14, a tool rest 16 and a tailstock 18.

Each section 12 of the machine bed 10 consists of an elongated block which on one of its longitudinal sides 20 has a dovetail spline 22 running parallel to its longitudinal direction midway between the longitudinal edges of that side and on its opposite longitudinal side has a complementary dovetail groove 26.

In the same way each section 12 on one of its end faces 28 has a dovetail spline 30 and on its opposite end face 32 has a complementary dovetail groove 34, with the spline 30 and the groove 34 being arranged parallel to the plane passing through the spline 22 and the groove 26. The cross sections of the splines 22 and 30 and of the grooves 26 and 34 correspond to one another.

Because of this construction two sections 12 can have their end faces set into one another to make a long machine bed, with the spline 30 of one of the sections 12 being inserted into the groove 34 of the other section 12, as is the case with the arrangement of FIGS. 1 and 2. Naturally, according to this principle several such sections 12 can also be connected to one another if an even longer machine bed is required.

The spindle stock 14, the tool rest 16 and the tailstock 18 each have on their lower surface a dovetail groove complementary to the spline 22 as is apparent in the case of the tailstock 18 of FIG. 3. Therefore these parts can be slid onto the dovetail spline 22. The fixing of the tool rest 16 and of the tailstock 18 as well as of other building components, can take place basically in the way represented in FIG. 3 for the tailstock 18. The tailstock has at the root of its dovetail groove a slot 36 extending along the length of and perpendicularly to the root surface. A bolt 40 with a knurled head 38 is threaded into the threaded portion 42 of a bore 44 in the tailstock 18 perpendicular to the plane of the slot 36, with the bolt passing through the plane of the slot 36. Upon tightening the bolt 40 the portions of the tailstock 18 lying on opposite sides of the slot 36 are drawn to one another so that the tailstock 18 becomes rigidly clamped to the machine bed 10. Basically this clamping arrangement can be provided in connection with all components which are to be connected to one another. The two sections 12 of the machine bed 10, as to this, have at their grooved ends a bore 46 in which a corresponding clamping bolt 40 can be screwed.

The spindle stock 14 contains a nonillustrated electric motor which drives a spindle 48 with a chuck 50. In the vicinity of the spindle stock's dovetail groove a pinion 54, shown in broken lines in FIG. 2 and rotatable by means of a knurled head 52, is rotatably supported in the spindle stock, which pinion meshes with a rack or toothed track 56 formed in the upper side 58 of each section 12 parallel to the dovetail spline 22. The teeth of the rack 56 do not extend above the upper surface 58 so that they do not interfere with the pushing of other building components onto the dovetail spline 22. By rotating the knurled head 52 of the pinion 54 the spindle stock can be moved in the longitudinal direction of the machine bed. A workpiece 60 such as shown by broken lines can be gripped between the spindle stock 14 and the tailstock 18 and can be worked with the help of a nonillustrated hand tool.

FIGS. 4 and 5 show a vertical drill press consisting of the two sections 12 of the machine bed described in connection with FIGS. 1 to 3 and of the spindle stock and a drill table. To do this one section 12 of the machine bed, which serves as the post, has its spline 34 pushed onto the dovetail groove 22 of the other section 12 which serves as the foot of the drill press and which at the same time carries the drill table 62, having on its underside a dovetail groove 64 complementary to the dovetail spline 22 (FIG. 5). By turning the knurled head 52 the spindle stock can be driven up and down and correspondingly the drill 66 in the chuck 50 can be lowered into the material and again lifted out of the drill hole. As will be evident, the conversion of the lathe into a drill press can be accomplished in an extremely simply way by removing the tailstock and the tool rest, by setting the two sections 12 at right angles to one another and by pushing the drill table onto the one section 12 of the machine bed.

FIG. 6 shows a hand drilling machine made up of a machine bed of two sections 12 and a spindle stock. For this purpose one section 12 has its dovetail spline 30 pushed into the bottom groove 26 of the section 12 carrying the spindle stock 14, so that the two sections are again positioned at right angles to one another with the end surface of the spindle stock 14 carrying section 12 and the underside 24 of the other section 12 lying in a common plane. A solid seat is thereby made for supporting the drilling machine during a drilling process, so that it is possible for even a child to hold the machine at rest during the drilling process.

Figure 8:
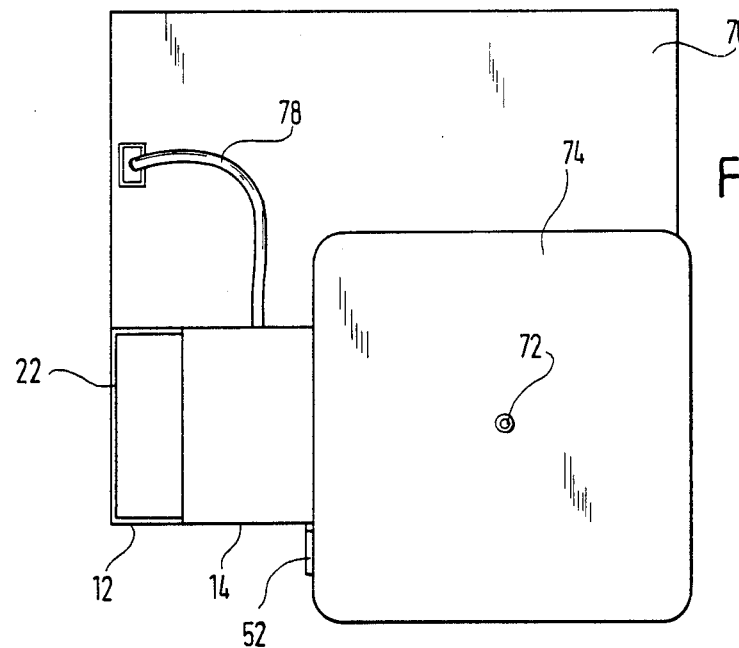
FIG. 8 is a plan view of the jigsaw of FIG. 7.

Finally, FIGS. 7 and 8 show a jigsaw built up from a section 12, the spindle stock 14 and a saw unit 68. This includes a block shaped foot part 70 having on its lower side a dovetail groove and which along with the spindle stock 14 is pushed onto the dovetail spline 22 of the section 12. Rotatably supported in the foot part 70 is a shaft couplable with the shaft of the spindle stock 14, which shaft of the foot part 70 moves a saw blade 72 up and down by means of a nonillustrated eccentric drive. The saw blade 72 extends through a saw table 74 resting on the foot part 70.

For increasing the rigidity of the jigsaw the section 12 is releasably connected, in a nonillustrated way, with a rectangular battery case 76 which serves to supply the electric motor arranged in the spindle stock 14 and which contains batteries connectible with the motor through a cable 78. The height of the battery case corresponds to that of the section 12.

The previous embodiments show that with the help of a few basic components and perhaps several additional elements in accordance with the invention a number of machine tools can be built, with the assembly of the individual machine tools from the individual components being extremely simple and something which can be accomplished by children in the first years of school. Despite the simplicity of the construction of the machine tools made from the inventive components, they permit the carrying out of a number of work processes especially on wood and plastic. The parts of the building set themselves can be economically manufactured out of plastic since the powers involved are low and no high precision of the parts is necessary.

Basically in the case of the described elements of the construction set the grooves and splines can be exchanged, yet the illustrated embodiments have been shown to have some special advantages. It is also conceivable that additional grooves and splines of similar cross section could be formed on the sections 12 of the machine bed 10 so as to increase the number of combination possibilities.

I claim:

1. A set of components for building machine tools, said set comprising at least one elongated machine bed, and at least one other component held to and adjustably guided on said machine bed by means of a groove and spline guide running in the longitudinal direction of said machine bed, said machine bed being divided perpendicularly to its longitudinal direction into at least two longitudinally aligned sections connected to one another by means of a groove and spline connection whose cross sectional dimensions correspond to that of said groove and spline guide between said bed and said other component so that said two sections of said bed may be disconnected from one another and reassembled with their longitudinal axes perpendicular to one another and with a groove and spline connection existing between the end face of one section and the longitudinal face of the other section.

2. A set of components according to claim 1 further characterized in that each of said sections of said bed on one of its end faces has a spline and on its other end face has a complementary groove, the cross sectional size and shape of said end face spline and groove being substantially identical to that of said groove and spline guide running in the longitudinal direction of said machine bed.

3. A set of components according to claim 1 further characterized in that said machine bed has a rectangular cross section, and in that the grooves and splines of said groove and spline guide and of said groove and spline connection each lie midway between and parallel to the edges of their associated surfaces of their associated section.

4. A set of components according to claim 1 further characterized in that the spline of said groove and spline guide is provided on said machine bed, and in that each of said sections of said machine bed has on the side opposite to said guide spline a complementary guide groove arranged parallel to said guide spline.

5. A set of components according to claim 1 further characterized in that at least one of two components of the set which are connectible to one another by a groove and spline has a clamping element with the help of which the other two connected components can be fixed relative to one another in a desired position.

6. A set of components according to claim 1 further characterized in that at least one rack is provided on said machine bed long said groove and spline guide which serves to hold said other components to said bed, which rack meshes with a gear supported by said other component.

7. A building set of components according to claim 1 further characterized in that said sections of said machine bed are constructed identical to one another.

8. A set of components according to claim 1 further characterized in that said other component is a spindle stock with a drive motor.

9. A set of components for building machine tools, said set comprising:

first, second and third components, said first and second components each consisting of an elongated block having two opposite longitudinal sides and two opposite end faces, said first and second components being of substantially identical cross sectional size and shape in planes perpendicular to their longitudinal axes, each of said first and second components having a longitudinally extending spline on one of its said longitudinal sides and a longitudinally extending groove on the other of its said longitudinally extending sides, each of said first and second components further having a spline on one of its said end faces and a groove on the other of its said end faces, all of said splines and grooves of said first and second components being of a similar cross sectional size and shape, with said splines being complementary to said grooves, so that either one of said splines of said first component can be inserted into either one of said grooves of said second component to join said first and second components to one another in any one of a number of relative orientations, and a third component carrying a machine tool element and having at least one face provided with a guide feature, selected from the class consisting of a spline and a groove each having a cross sectional size and shape similar to that of said splines and grooves of said first and second components, whereby said third component may be assembled with either said first or second component by mating said guide feature to any complementary one of said splines and grooves of said first and second components.

10. A set of components for building machine tools as defined in claim 9 further characterized by said splines and grooves of said first and second components all being located midway between and parallel to the edges of the surfaces containing them.

11. A set of components for building machine tools as defined in claim 9 further characterized by at least one of said first and second components having a clamping element associated with the groove on its end face whereby the side surfaces of said groove may be moved toward and away from one another to grip and release a spline which may be received in said groove.

12. A set of components for building machine tools as defined in claim 9 further characterized by at least one of said first and second components having a rack on and extending longitudinally of one of its said longitudinal sides, said rack having its teeth located entirely below the level of the surface of said longitudinal side so as not to interfere with the sliding of another component over said surface of said longitudinal side.

13. A set of components for building machine tools as defined in claim 12 further characterized by said third component having a pinion which meshes with said rack when said third component is mounted on the longitudinal side with which said rack is associated with its guide feature mated with the spline or groove of said longitudinal side.

* * * * *